United States Patent [19]

Kirkpatrick

[11] 3,985,909

[45] Oct. 12, 1976

[54] INCORPORATING A GAS IN CANDY

[75] Inventor: Paul A. Kirkpatrick, New Rochelle, N.Y.

[73] Assignee: General Foods Corporation, White Plains, N.Y.

[22] Filed: Oct. 1, 1975

[21] Appl. No.: 618,527

[52] U.S. Cl. ............................. 426/572; 426/660; 426/474
[51] Int. Cl.² .......................................... A23G 3/00
[58] Field of Search ............ 426/572, 474, 477, 660

[56] References Cited
UNITED STATES PATENTS

| | | | |
|---|---|---|---|
| 2,082,313 | 6/1937 | Todd | 426/474 |
| 2,197,919 | 4/1940 | Bowman | 426/474 |
| 2,600,569 | 6/1952 | Oakes | 426/474 |
| 3,012,893 | 12/1961 | Kremzner | 426/572 |
| 3,503,757 | 3/1970 | Rubenstein | 426/474 |

*Primary Examiner*—Jeanette M. Hunter
*Attorney, Agent, or Firm*—Richard Kornutik

[57] ABSTRACT

This invention relates to a method of incorporating a gas in a candy glass. The incorporation or mixing of the gas takes place in a vessel containing hot candy (sugar) melt under superatmospheric pressure. The melt is stirred within the vessel using a rotatably mounted shaft with paddle blades attached to it and is mounted on the vertical axis of the vessel. Said shaft has a hollow interior with sidewall openings at each end. The level of the melt in the vessel envelops the paddle blades and the lower opening of said shaft. Thus, when the gas is introduced at the top of the vessel, it enters the shaft at the top opening and exits at the bottom opening and is dispersed within the melt by the rotating paddle blades.

6 Claims, No Drawings

INCORPORATING A GAS IN CANDY

BACKGROUND OF THE INVENTION

This invention relates to the production of carbonated candy which is a hard candy containing carbon dioxide gas as disclosed in U.S. Pat. No. 3,012,893 which is herein incorporated by reference. Ideally, such a carbonated candy when placed in the mouth produces an entertaining popping sensation. However, to obtain a successful product, it is necessary to control the processing in a number of critical areas. The preparation of the candy melt should be prepared with a minimum of heat treatment in order to limit hydrolysis and decomposition of its sugar constituents. Both hydrolysis and decomposition can soften the candy glass which prevents a good "pop" in the product. The influence of temperature on cooked candy while gas is being added is an important variable. It is believed that the viscosity of the cooked mass has an effect on the gas incorporation. Thus, if the melt is allowed to cool too much, the candy will have little "pop" since the gas will not mix with the melt at reduced temperatures.

Candy glasses are sensitive to moisture. Moisture make candy glasses less brittle or more pliable. As the candy becomes less brittle, due to either excess moisture or heat, crystallization of the sugar can occur. This crystalline state allows the gas to more readily escape. The moisture content of the final product is preferably just below about 2.5%. If the moisture content is higher, the candy becomes less brittle and more tacky.

The mechanism for incorporation of the gas in glass is one of dividing gas bubbles into minute dimensions. The thickness of the walls surrounding the gas bubbles must be sufficient when solidified to hold the pressure exerted by the gas. At any given pressure, the smaller the gas bubble the smaller can be the thickness of the wall of candy glass in order to contain the pressure. While other gases may be used, such as nitrogen or nitrous oxide, it is most desirable to use carbon dioxide since it imparts an acid sourness and tingle which is not present in other gases.

Ideally, the candy glass contains 4 to 6 cc. of $CO_2$ per gram. When $CO_2$ is introduced under pressure to a vessel containing a candy melt, the resultant product contains only up to about 2 cc. per gram of $CO_2$. It has been found that it is necessary to agitate the melt at relatively high speed, i.e., over 1200 R.P.M., in order to incorporate greater amounts of gas in the product. Additionally, it has been found that a relatively large headspace must be maintained above the level of the melt within the vessel. Means must be provided to disperse the gas in the bottom of the vessel. Thus, agitator must operate a speed sufficiently high enough to create a vortex within the vessel so that the gas may be drawn into the agitator blades which are generally located near the bottom of the vessel. The combination of high shaft speed and headspace permits a violent churning and mixing action to take place within the vessel, thus allowing more gas to be admitted to the melt than if the melt were gently mixed or quiescent.

Therefore, it would be highly desirable if a simple method were devised to easily incorporate greater volumes of $CO_2$ within a candy glass without excessive agitation.

SUMMARY OF THE INVENTION

This invention relates to a method of incorporating a gas in a candy glass. The candy melt is introduced into a pressure vessel. A shaft with mixing means is rotatably mounted along the vertical axis of the vessel. The shaft has a hollow interior with sidewall openings at each end. The level of the melt in the vessel covers the paddle blades and the lower opening of the shaft. Gas, preferably $CO_2$, is then allowed to enter the vessel at superatmospheric pressure in the area above the melt. This permits the gas to enter the shaft at the top opening and exit at the bottom opening, thereby facilitating the dispersion of the gas within the melt in conjunction with the mixing action generated by the rotating paddle blades.

DETAILED DESCRIPTION OF THE INVENTION

While not wishing to be held to a particular theory, it is believed that the initial mixing in a pressure vessel with $CO_2$ with a candy melt using conventional mixing techniques allows the $CO_2$ to go into solution in the hard candy. Carbonation in candy glass at these levels as a characteristic fizz but very little "pop." It is necessary to incorporate larger amounts of $CO_2$ in a glass to result in a product which has satisfactory fizzle and pop. The present invention allows $CO_2$ bubbles which are larger than those which are considered to be in solution in the candy glass to be mixed in the glass system. Ideally, the final product will contain 4 to 6 cc. per gram. It is believed that the first 2 cc. per gram of such a product results from $CO_2$ being in solution in the candy. An additional 4 cc. per gram of $CO_2$ is obtained according the process of the instant invention.

The pressure vessel used in the instant invention is commonly called an autoclave and is capable of withstanding pressures upward of 2,000 p.s.i. Typically, a shaft is rotatably mounted through the top half of the vessel. The shaft extends almost to the bottom of the vessel, and at the lower end of the shaft is mounted one or more paddle blades to facilitate mixing of materials within the vessel. Outside the vessel a motor is mounted and connected to the shaft by drive means to rotate the shaft. The liquid level of the material to be processed in the vessel generally is above all of the mixing blades but lower than the topmost portion of the tank. This portion between the top of the tank and the level of the material can be called headspace.

According to the process of the instant invention, the liquid material in the vessel is candy melt. The portion of the shaft mounted inside the vessel has a hollow interior with sidewall openings at each end. The liquid level in the vessel covers the lower opening of the shaft and a number of the paddle blades. Carbon dioxide is introduced at superatmospheric pressure in the headspace. If the shaft were solid, only a minimum amount of carbon dioxide would pass through the headspace/sugar melt interface and go into solution with the melt. Even with the rotation of the paddle blades to encourage the mix, the resultant product contains less than an ideal amount of carbon dioxide. However, the present invention allows the gas within the headspace to enter the hollow shaft at the headspace level and to exit at the bottom of the shaft and be dispersed within the melt by the rotation of the paddle blades. The gas thus dispersed exists in the melt and relatively large diameter bubbles compared to the size of the bubbles achieved by conventional mixing. Thus, a carbonated candy produced according to the process of this invention has significantly more "pop" than a conventional carbonated candy which contains the same total amount of $CO_2$. Additionally, those bubble which are exceptionally large or for whatever reason do not become entrapped in the mixture will rise up to the headspace and be recycled as a gas to the bottom of the shaft.

An advantage of this process according to this invention is that the mixing speeds can be relatively low, for example 400 to 500 R.P.M.

It will be appreciated that other methods introducing gas into a vessel containing melt meet with undesirable results. For example, simply allowing the gas to enter at the bottom of the tank would create very large bubbles of gas which will rise into the headspace and have no opportunity to be recirculated. within the mix.

EXAMPLE

Ten gallons of candy melt were prepared and placed in a Dependable Welding Service autoclave. This autoclave had mounted on it a Reeves Drive agitator which rotated at 450 R.P.M. A portion of the shaft within the vessel had a hollow interior with sidewall openings at each end. Three sets of paddle blades were installed on the lower portion of the shaft. Candy melt was placed in the tank such that the paddle blades in the lower opening of the shaft were enveloped by the melt and the top opening was in the headspace between the top of the vessel and the surface level of the melt. Carbon dioxide was then introduced to the headspace at superatmospheric pressure until the pressure within the vessel equilibrated at 600 p.s.i. This pressure was maintained while the melt was admixed by the paddle blades for at least 5 minutes. Next, the product was allowed to cool to room temperature (about 70° F) and was subsequently removed from the pressure vessel.

The resultant product was found to contain 6 cc. per gram of carbon dioxide and significantly greater "pop" than a conventionally processed carbonated candy containing an identical amount of $CO_2$.

What is claimed is:

1. A method of incorporating a gas in a candy glass which comprises:
   a. a candy melt,
   b. introducing the melt in to a pressure vessel within which a shaft is rotatably mounted along the vertical axis of said vessel, said shaft having mixing means attached to it, said shaft having a hollow interior connecting sidewall openings in its top portion and bottom portion such that the level of the melt covers at least part of the mixing means and the bottom opening of said shaft,
   c. introducing a gas into the vessel at superatmospheric pressure in the headspace area above the melt so that the gas enters the shaft at the top opening and exits at the bottom opening so that the gas is dispersed within the melt by the mixing means,
   d. isolating the pressure vessel from the gas supply, and
   e. allowing the melt to cool to room temperature and solidify.

2. Process of claim 1 wherein the gas is carbon dioxide.

3. Process of claim 2 wherein the superatmospheric pressure is between 400 and 700 p.s.i.

4. The process of claim 3 wherein all of the paddle blades are below the surface of the melt.

5. The process of claim 4 wherein the temperature of the candy melt is maintained at above 100° C prior to cooling.

6. The process of claim 5 wherein the rotation speed of the shaft is between 400 and 500 R.P.M.

* * * * *